United States Patent [19]

Lee et al.

[11] 4,176,433
[45] Dec. 4, 1979

[54] METHOD OF REMANUFACTURING TURBINE VANE CLUSTERS FOR GAS TURBINE ENGINES

[75] Inventors: Jack W. Lee, Palm Beach Gardens; Charles A. Voehringer, Boynton Beach, both of Fla.

[73] Assignee: United Technologies Corporation, Hartford, Conn.

[21] Appl. No.: 920,582

[22] Filed: Jun. 29, 1978

[51] Int. Cl.² .................................... B23P 15/04
[52] U.S. Cl. ........................ 29/156.8 B; 29/403.1; 29/402.07; 29/416; 148/11.5 N; 427/104; 415/189; 415/200; 83/15; 219/69 M; 228/119; 228/171; 228/193; 228/231
[58] Field of Search ............ 29/156.8 R, 156.8 B, 29/401 R, 401 A, 401 F, 412, 416, 527.4, 527.6; 148/11.5 N; 427/104; 415/189, 200, 198.1; 83/15, 170; 219/69 M, 69 E; 228/119, 170, 171, 231, 193

[56] References Cited

U.S. PATENT DOCUMENTS

| 648,687 | 5/1900 | Garlock | 83/15 |
|---|---|---|---|
| 1,686,937 | 10/1928 | Six | 29/156.62 |
| 2,637,521 | 5/1953 | Constantine et al. | 29/156.8 R |
| 3,412,447 | 11/1968 | Summerfield | 219/69 M |
| 3,678,570 | 7/1972 | Paulonis et al. | 228/194 |
| 3,778,877 | 12/1973 | Walker | 29/156.62 |
| 3,797,085 | 3/1974 | Aartman | 29/156.8 R |
| 3,920,947 | 11/1975 | Wachtell et al. | 219/69 M |
| 4,050,133 | 9/1977 | Cretella et al. | 29/156.8 B |

FOREIGN PATENT DOCUMENTS 734210 7/1955 United Kingdom ............... 29/156.8 R Primary Examiner—Francis S. Husar
Assistant Examiner—Daniel C. Crane
Attorney, Agent, or Firm—Robert C. Walker

[57] ABSTRACT

A method for remanufacturing turbine vane clusters of gas turbine engines is disclosed. Concepts and techniques for salvaging undamaged vanes from a damaged vane cluster are developed. In accordance with the method taught, protective coatings on the vane clusters are removed and residual stresses in the vanes are relieved before salvageable vanes are separated from their original vane cluster.

5 Claims, 2 Drawing Figures

METHOD OF REMANUFACTURING TURBINE VANE CLUSTERS FOR GAS TURBINE ENGINES

The Government has rights in this invention pursuant to Contract No. F33615-76-C-5151 awarded by the Department of the Air Force.

BACKGROUND OF THE INVENTION

This invention relates to gas turbine engines and, more specifically to methods for remanufacturing turbine vane clusters from salvageable vane components.

In a gas turbine engine of the type to which the present invention is directly applicable, working medium gases are burned in a combustion section and are expanded through a turbine section. Disposed within the turbine section are one or more rows of stator vanes which are adapted to direct the working medium gases to a preferred angle of approach into a downstream row of rotor blades.

The vanes of the turbine have a limited life and are among the most susceptible of gas turbine engine components to damage. The medium gases directed across the vanes are extremely hot and likely contain corrosive constituents. For example, the initial row of stator vanes in a modern turbine is exposed to gases having temperatures well in excess of two thousand degrees Fahrenheit (2000° F.). Corrosive constituents contained within the medium gases include unreacted oxygen and oxides of sulfur. Violent energy reactions upstream of the stator vanes make it nearly impossible to control the homogeneity of the medium gases approaching the vanes. Accordingly, the vanes do not wear evenly and individual vanes are likely to need replacement before the entire set.

For ease of installation of the vanes and for aerodynamic performance considerations, it is conventional practice to form a row of stator vanes from clusters comprising a plurality of individual vanes each. The clusters are disposed in end to end relationship circumferentially around the working medium flow path. Paired vanes such as those illustrated in the present drawing are commonly employed although each cluster may also comprise three or more vanes.

To reduce replacement costs of vanes, designers and manufacturers of gas turbine engines have sought techniques for salvaging reusable portions of vane clusters and combination of salvaged portions to form remanufactured components.

SUMMARY OF THE INVENTION

A primary object of the present invention is to provide a method for remanufacturing turbine vane clusters of the type utilized in gas turbine engines. Effective methods for salvaging undamaged vanes from a damaged vane cluster and combining the salvaged vanes to form a remanufactured cluster are sought.

According to the present invention vanes to be salvaged from a damaged vane cluster are stripped of coating materials and stress relieved prior to separation from the original vane cluster.

In accordance with one detailed embodiment of the invention, faying surfaces on the vanes to be joined are simultaneously machined in a coelectric discharge machining process wherein the workpieces to be machined serve as the electrodes in the discharge machining apparatus.

A primary feature of the invention is the step of stripping corrosion resistant coating materials from the surfaces of the vanes to be salvaged. Another feature is the step of relieving residual stresses from the damaged vane cluster prior to separation of the salvageable vane. Yet another feature in at least one embodiment is the step of machining faying surfaces on the vane components to be joined.

A principal advantage of the invention is the ability to produce low cost vane clusters from undamaged components of damaged clusters. High quality vane clusters are produced by avoiding incipient melting of the parent material during remanufacture and by avoiding distortion from residual stresses after the salvaged vanes are separated from the damaged clusters. Direct correspondence between the faying surfaces of the vanes to be joined is assured in one method by simultaneously machining the faying surfaces in a coelectric discharge machining process.

The foregoing, and other objects, features and advantages of the present invention will become more apparent in the light of the following detailed description of the preferred embodiment thereof as shown in the accompanying drawing.

DETAILED DESCRIPTION

The vane clusters to which the present methods of remanufacture applies are of the type utilized in the turbine section of a gas turbine engine to direct hot working medium gases to a preferred angle of approach into a downstream row of rotor blades. The methods are described with respect to a two-vane structure, however, the concepts are equally applicable to clusters having more than two vanes.

Figure 1:
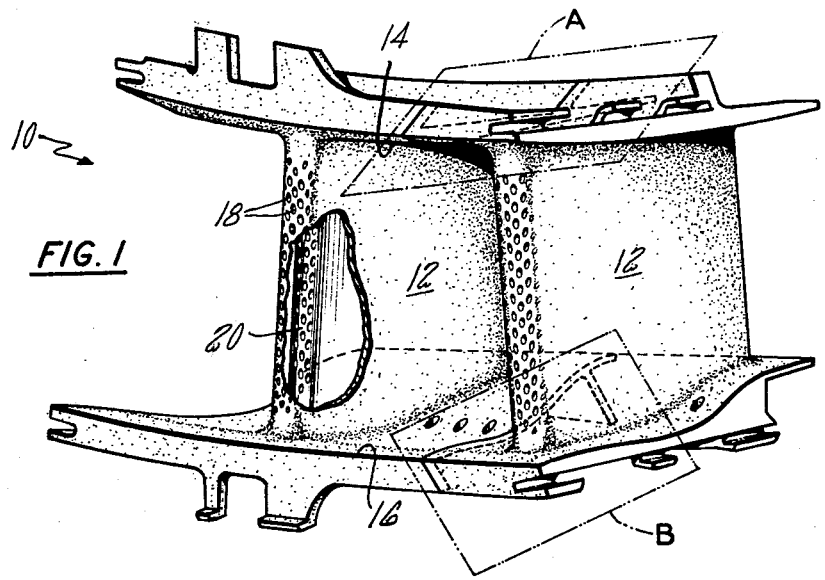
FIG. 1 is a perspective view of a two-vane cluster to which the present method of remanufacture applies.
Figure 2:
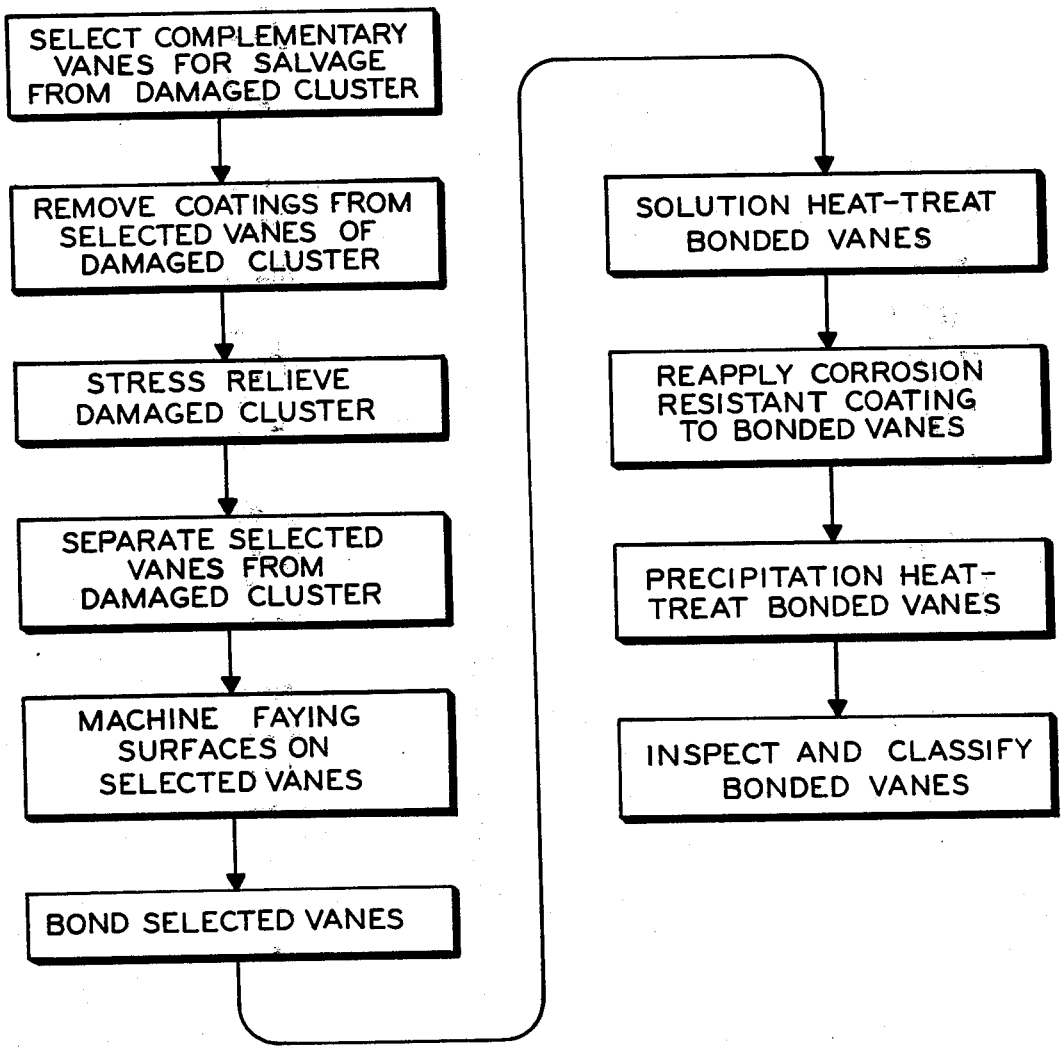
FIG. 2 is a block diagram illustrating the sequence of steps employed in the present method of remanufacture.

FIG. 1 illustrates such a two-vane cluster 10. The cluster shown has two vanes 12 which extend between an inner platform 14 and an outer platform 16. The vane typically has a plurality of cooling holes 18 disposed in the vanes and platforms of the cluster. A cooling tube 20 is employed to direct the cooling medium against the interior surfaces of the vanes. The vane cluster is typically fabricated from a high quality, nickel-base superalloy material and is coated with a corrosion resistant material. Notwithstanding the use of such materials, the vanes become cracked, corroded, and otherwise damaged during extended service and need be replaced during maintenance and overhaul of the engine. The methods of reconstruction disclosed herein contemplate the severance of undamaged vanes from a damaged vane cluster and combining complementary vanes to form a remanufactured vane cluster.

The methods employ the principle steps of: inspecting damaged vane clusters and selecting complementary vanes for combination into a reconstructed cluster; stripping coating materials from the selected vanes and from portions of the vane platforms contiguous thereto; relieving residual stresses in the entire vane cluster in which the selected vanes are contained; separating the selected vanes and contiguous portions of the platforms from the damaged vane clusters; machining bond faying surfaces in the platforms of the complementary vanes selected for combination; bonding the complementary vanes at the faying surfaces to form a vane cluster; solution heat treating the vane cluster; applying corrosion resistant coating material to surfaces of the vane cluster which are exposed to hot working medium gases; and precipitation hardening the coated vane cluster.

The salvageable vane is separated from the damaged vane cluster at a midpoint along the inner platform 14 and outer platform 16. Complementary vanes are joined at the bond plane A at the inner platform and at the bond plane B at the outer platform. The orientation of the bond plane A and the bond plane B is not critical as long as the bond integrity remains secure. An extra measure of safety is obtainable by orienting the bond planes in accordance with the teaching in U.S. patent application Ser. No. 920,583, filed on even date herewith. In such an embodiment the complementary vanes are capable of retention in an engine notwithstanding failure of the bond.

The step of stripping coating material from the vanes is one critical step in the described procedure. In areas where coatings are not removed incipient melting of the vane alloy is likely to occur during the bonding cycle and subsurface material voids may resultantly develop. It is, therefore, that all coating materials are preferably removed from surfaces of the vanes and platforms selected for salvage.

The step of relieving residual stresses in the vane cluster is performed prior to separation of a salvageable vane from its damaged vane cluster. Relieving the stresses with the discardable vane attached, holds the vane platforms at near print dimensions during stress relief without additional fixturing. Without stress relief subsequent machining and heating processes induce deformation and resultant mismatch at the platforms.

For one vane material system in which a two-vane structure of directionally solidified MAR-M-200+Hf alloy (nominal by weight: 9% Cr, 10% Co, 12.5% W, 1% Cb, 2% Ti, 5% Al, 0.015% B, 0.05% Zr, 0.15% C, 1.5% Hf, and Balance Ni) material is coated with an aluminide protective material such as the type known in the industry as PWA 73, the following detailed manufacturing method has proved successful:

(1) Inspect damaged vane clusters and identify salvageable vanes and their associated platforms. Select a pair of complementary vanes from the identified, salvageable vanes.

(2) Remove appendages, such as internal cooling tubes, from the cast material.

(3) Chemically strip the aluminide protective coating from the internal and external surfaces of the salvageable vane as follows:

a. Grit blast the external and internal coated surfaces of the vane cluster with No. 240 aluminum oxide grit.

b. Immerse the vane cluster in an agitated nitric acid solution (20% by volume of 42° Baume) at seventy-five to ninety degrees Fahrenheit (75°–90° F.) for four (4) hours.

c. Wet abrasive blast the external and internal surfaces with a No. 200 or finer soft type abrasive such as the silicon dioxide abrasive known in the industry as Novaculite (Chicago Wheel and Manufacturing Company, Chicago, Ill).

d. Immerse the vane cluster in an agitated nitric acid solution (20% by volume of 42° Baume) at seventy-five to ninety degrees Fahrenheit (75°–90° F.) for four (4) hours.

e. Wet abrasive blast the external and internal surfaces with a No. 200 or finer soft type abrasive such as the silicon dioxide abrasive known in the industry as Novaculite.

f. Immerse the vane cluster in an agitated nitric acid solution (20% by volume of 42° Baume) at seventy-five to ninety degrees Fahrenheit (75°–90° F.) for four (4) hours.

g. Wet abrasive blast the external and internal surfaces with a No. 200 or finer soft type abrasive such as the silicon dioxide abrasive known in the industry as Novaculite.

h. Rinse the vane cluster in clean cold water.

(4) Relieve residual stresses from the vane cluster by heating the cluster in argon at a partial pressure vacuum of one and one half to two (1.5–2.0) torr at two thousand two hundred degrees Fahrenheit (2200° F.) for two (2) hours.

(5) Separate the salvageable vane and contiguous inner and outer platforms from the vane cluster. Separation may include cutting by a convention aluminum oxide or, silicon carbon abrasive wheel. Alternatively, the vane may be cut by electrical discharge machining.

(6) Inspect the separated vane and platforms for distortion. Correct any distortion by mechanically deforming the vane. The vane may be heated during correction of distortion to temperatures up to two thousand degrees Fahrenheit (2000° F.).

(7) Grind platforms of the vanes to be joined to within thirteen to fifteen thousandths (0.013–0.015) of an inch extra stock at the bond planes.

(8) Coelectrical discharge machine the platform surfaces to be joined using one vane as the positive electrode in the discharge machining apparatus and using the complementary vane as the negative electrode in the discharge machining apparatus. After machining the platform surfaces to be joined, or faying surfaces, must be capable of complete contact with each other.

(9) Clean the bond faying surfaces using an effective process, such as the electrolyte alkaline process which follows:

a. Wet vapor blast the faying surfaces with a No. 200 or finer soft type abrasive such as the silicon dioxide abrasive known in the industry as Novaculite.

b. Immerse the faying surfaces in an alkali solution such as a water base solution of eighteen to twenty-four (18–24) ounces of Endox 114 (Ehthone, Inc., West Haven, Conn.) or equivalent and eight to fourteen (8–14) ounces of sodium cyanide per gallon of solution at one hundred twenty plus or minus ten degrees Fahrenheit (120°±10° F.) with periodic current reverse of ten (10) seconds anodic, ten (10) seconds cathodic, for two minutes plus or minus one-half minute (2 min.±½ min.) at twenty-five to thirty-five amperes per square foot (25 to 35 ASF).

c. Rinse in clean water.

d. Immerse in a hydrochloric acid solution (HCl 65% by volume of 20° Baume). Make anodic at sixty (60) ASF for one (1) minute.

e. Rinse in clean water.

f. Immerse in the alkali solution of step 9b at one hundred twenty plus or minus ten degrees Fahrenheit (120°±10° F.) and agitate for thirty (30) seconds.

g. Rinse in clean water.

h. Immerse in a hydrochloric acid solution (HCl 65% by volume of 20° Baume) for thirty (30) seconds.

i. Rinse in clear water.

j. Immerse in acid solution (HNO₃ at 40% by volume 42° Baume, HF at 2% of 70 molecular weight percent by volume) at room temperature for ten (10) seconds.

k. Rinse in hot demineralized water at one hundred eighty to two hundred degrees Fahrenheit (180°-200° F.) for ten (10) seconds.

l. Blow dry using argon or hot air.

m. Visually inspect the bond faying surfaces. Properly cleaned surfaces will exhibit a bright or gray color.

n. Repeat the cleaning as many times as required until the surfaces exhibit the bright or gray color of step 9m.

(10) Bond the complementary vanes at the faying surfaces employing a high quality bond technique such as the diffusion bonding TLP ® process (United Technologies Corporation, Hartford, Conn.) disclosed in U.S. Pat. No. 3,678,570.

(11) Dress off excess bonding alloy and any joint mismatch on the bonded vanes.

(12) Optically inspect the bonded vanes at 10× magnification for complete bonding. No unbonded areas are allowed.

(13) Dimensionally inspect the bonded vanes. Remachining to remove extra material is allowed. Minor dimensional restoration may be performed on the vane platform machined surface areas using conventional plasma spray techniques with PWA 1347 alloy powder (nominally by weight: 6% Al, 18.5% Cr, and Balance Ni). Grit blast the surface using No. 30 grit silicon carbide prior to plasma spray. Deposits up to thirty thousandths (0.030) of an inch thick may be applied on the platform edges. Conventional gas tungsten-arc welding, direct current straight polarity, may also be utilized with Inconel 625 filler metal (nominally by weight: 0.05% C, 0.15% Nn, 0.3% Si, 22% Cr, 9% Co, 4% Cb, 0.2% Ti, 0.2% Al, 3% Fe, and Balance Ni). Weld deposits up to sixty thousandths (0.060) of an inch thick may be made on these machined surface areas. Machine the plasma spray and weld deposits to meet vane dimensional requirements.

(14) Solution heat treat the bonded vanes at two thousand two hundred degrees Fahrenheit (2200° F.) in a static partial pressure vacuum of argon at one and one-half to two (1.5-2.0) torr for two (2) hours. Cool by back filling argon at a rate equivalent to air cool.

(15) Reapply a corrosion resistant coating such as PWA 73 aluminide protective coating to the surfaces of the cluster which are exposed to the working medium gases of an operating engine.

(16) Reinstall cooling tubes as required.

(17) Precipitation heat treat at sixteen hundred degrees Fahrenheit (1600° F.) for thirty-two (32) hours in air.

(18) Final inspect and classify the vane cluster.

Although the invention has been shown and described with respect to preferred embodiments thereof, it should be understood by those skilled in the art that various changes and omissions in the form and detail thereof may be made therein without departing from the spirit and the scope of the invention.

Having thus described typical embodiments of our invention, that which we claim as new and desire to secure by Letters Patent of the United States is:

1. A method for remanufacturing turbine vane clusters of the type having two or more coated vanes extending between a common inner platform and a common outer platform, comprising the steps of:
  inspecting damaged vane clusters and selecting complementary vanes and contiguous platforms for combination into a reconstructed cluster;
  stripping the coating materials from the selected vanes and from the portions of the platforms contiguous thereto;
  relieving residual stresses in the entire vane clusters in which the selected vanes are contained prior to the step of separating the selected vanes from the clusters;
  separating the selected vanes and the portions of the platforms contiguous thereto from the vane clusters after the step of relieving stresses from the vane clusters;
  machining bond faying surfaces on the platforms of the complementary vanes selected for combination;
  cleaning the machined faying surfaces;
  bonding the complementary vanes at the faying surfaces to form a reconstructed vane cluster;
  solution heat treating the reconstructed vane cluster;
  applying corrosion resistant coating to surfaces of the vane cluster which are to be exposed to hot working medium gases;
  precipitation hardening the coated vane cluster.

2. A method for remanufacturing turbine vane clusters of the type cast of MAR-M-200+Hf alloy and coated with an aluminide corrosion resistant coating, comprising the steps of:
  inspecting damaged vane clusters and selecting complementary vanes and contiguous platforms for combination to form a reconstructed vane cluster;
  removing all appendages attached to the castings:
  stripping the aluminide coating from the selected vanes by grit blasting the coated surfaces and immersing the clusters in a nitric acid solution until the coating is removed;
  relieving residual stresses in the vane clusters by heating the clusters in an argon atmosphere for two (2) hours at two thousand two hundred degrees Fahrenheit (2200° F.);
  separating the selected vanes and contiguous platforms from the damaged vane clusters;
  inspecting the separated vanes for distortion and correcting any such distortion by mechanically deforming the vane at temperatures up to two thousand degrees Fahrenheit (2000° F.);
  machining bond faying surfaces on the platforms of the complementary vanes;
  cleaning the bond faying surfaces;
  bonding the complementary vanes at the faying surfaces;
  solution heat treating the bonded vanes in an argon atmosphere at two thousand two hundred degrees Fahrenheit (2200° F.) for two (2) hours;
  applying aluminide, corrosion resistant coating to surfaces of the cluster which are to be exposed to hot working medium gases;
  precipitation heat treating the bonded vanes in or at sixteen hundred degrees Fahrenheit (1600° F.) for thirty-two (32) hours.

3. The method according to claim 2 wherein the step of machining bond faying surfaces includes coelectric discharge machining the bond faying surfaces employing one of the complementary vanes as the negative electrode in the discharge machining apparatus and employing the opposing complementary vane as the positive electrode in the discharge machining apparatus.

4. The invention according to claims 2 or 3 wherein the step of cleaning the bond faying surfaces includes the step of electrolyte alkaline cleaning the surfaces.

5. The invention according to claims 2, 3 or 4 wherein the step of bonding complementary vanes includes the step of diffusion bonding the vanes.

* * * * *